US005394222A

United States Patent [19]
Genovese

[11] Patent Number: 5,394,222
[45] Date of Patent: Feb. 28, 1995

[54] CORRECTION OF MISALIGNMENT IN A MULTICOLOR IMAGING APPARATUS UTILIZING A CONFORMABLE FRICTION DRIVE SYSTEM

[75] Inventor: Frank C. Genovese, Fairport, N.Y.
[73] Assignee: Xerox Corporation, Stamford, Conn.
[21] Appl. No.: 169,690
[22] Filed: Dec. 17, 1993
[51] Int. Cl.$^6$ ............................................. G03G 21/00
[52] U.S. Cl. ..................................... 355/208; 198/806; 355/212; 355/275; 474/102
[58] Field of Search ............... 355/200, 211, 212, 327, 355/208, 275, 281; 476/16, 17, 72; 474/92, 237, 3, 6, 102, 103, 111, 122, 133, 135, 270, 271; 198/806, 807, 833

[56] References Cited

U.S. PATENT DOCUMENTS

| | | | |
|---|---|---|---|
| 4,320,963 | 3/1982 | Satomi | 355/50 |
| 4,429,985 | 2/1984 | Yokota | 355/212 |
| 4,527,686 | 7/1985 | Satoh | 198/807 |
| 5,016,062 | 5/1991 | Rapkin | 355/327 |
| 5,078,384 | 1/1992 | Moore | 355/317 X |
| 5,169,140 | 12/1992 | Wenthe | 271/228 |
| 5,202,733 | 4/1993 | Hediger et al. | 355/271 |
| 5,225,877 | 7/1993 | Wong | 355/212 |

FOREIGN PATENT DOCUMENTS 0088561 4/1989 Japan .................................. 355/211

*Primary Examiner*—Robert B. Beatty
*Attorney, Agent, or Firm*—Denis A. Robitaille

[57] ABSTRACT

A system for transporting an imaging surface in an electrostatographic printing apparatus. The imaging surface is transported along a predetermined path in a process direction of travel while being maintained in both lateral and skew alignment via a selectively controllable drive system for inducing differential or non-differential transport motion of the imaging surface. A control system is also provided for selectively operating the drive system to compensate for detected lateral or skew misalignment of the imaging surface.

18 Claims, 6 Drawing Sheets

CORRECTION OF MISALIGNMENT IN A MULTICOLOR IMAGING APPARATUS UTILIZING A CONFORMABLE FRICTION DRIVE SYSTEM

The present invention relates generally to a system for transporting and steering a web-like belt along a predetermined path, and more particularly, concerns an image registration system utilizing a conformable friction drive mechanism for advancing a belt surface through various processing stations in an electrostatographic printing apparatus.

Generally, the process of electrostatographic printing is initiated by exposing a substantially uniformly charged photoreceptive member with light flux in the form of an image of an original document. Exposing the charged photoreceptive member to light flux discharges a photoconductive surface thereon in areas corresponding to the bright areas in the original document, without disturbing the charge in dark areas, thereby creating an electrostatic latent image of the original document on the photoreceptive member. This latent image is subsequently developed to make it visible by flooding the surface of the photoreceptive member with developing material which is attracted to and adheres to the charged latent image areas thereon. The developing material adhering to the photoreceptive member is then transferred to a copy sheet where it may be affixed using heat or pressure to provide a permanent reproduction of the original document. In a final step, the surface of the photoreceptive member is cleaned to remove any residual developing material therefrom in preparation for subsequent imaging cycles.

The foregoing discussion generally describes a typical black and white electrophotographic printing process. This process is well known and is useful for light lens copying from an original, as well as for printing applications using electronically generated images and documents. Analogous processes also exist in other electrostatographic applications such as, for example, ionographic systems, where positive or negative gaseous ions are deposited on a charge retentive surface in accordance with an image stored in electronic form. Further, with the advent of multicolor electrostatographic technology, various system architectures based on the described process have been implemented. An example is the so-called tandem architecture, wherein a plurality of drum photoreceptors, each having a color separated image thereon, are used in combination with an intermediate transfer member to provide both high throughput speed and high image quality.

In a typical electrostatographic printing machine, a drive system is provided for transporting the photoreceptive member or the intermediate transfer member, in the form of a rigid drum or a web-like belt, through the various processing stations described hereinabove. Generally, such drive systems of this nature include an electric motor coupled to a rotational body mounted on a shaft which is connected to the drum or frictionally coupled to the interior surface of the belt. Such systems also generally include speed reducing subsystems and regulating mechanisms for delivering the desired rotational torque or surface speed to the drum or belt being transported. However, it is not uncommon that a drum member is not precisely centered or that a belt is entrained about cylindrical rollers which do not run perfectly true, or which are not configured in an exactly parallel alignment with one another, such that it is not feasible to maintain a velocity vector on the drum or belt at a precisely constant speed at all critical points. This problem can be further exacerbated by imperfections in the system geometry which cause the drum or belt surface velocity vector at the most critical points to extend in directions that are not normal to a common datum line.

Since the final output image produced by the electrostatographic printing process takes many forms and passes through a plurality of functionally distinct processing stations during the printing operation, precise and constant speed control of of image bearing surfaces is very important. Moreover, in color applications where multiple electrostatic latent images are developed with separate color toners and transferred to a common surface, the accurate location, or so called registration, of an image on a photoreceptor or on an intermediate transfer member is particularly critical for providing high quality results. When the separate colors images are superimposed to form a full-color image, the slightest misregistration of the component colors can cause undesirable artifacts to appear that render the final output copy unacceptable. Registration problems may manifest themselves through image defects ranging from readily detectable color fringes surrounding sharp edges within the image proper, to more subtle "moire fringes" resulting in visible spatial interference patterns distributed throughout the image, commonly referred to as "color contouring" or "banding". In order to avoid these defects, particularly in a color printing system intended to provide high quality images, the position of the photoreceptive member and the surface of the intermediate transfer member, both in the process direction as well as in the direction transverse thereto, must be precisely controlled so that accurate and extremely precise positioning of the individual color separations in the superimposed output image can be provided.

Thus, it is apparent that the location of surfaces of the photoreceptive member and the image receiving intermediate transfer member must be precisely defined and controlled in order to allow the various processing stations to perform in a manner that optimizes output copy quality. To this end, it is critical that both the velocity and the lateral alignment of the intermediate transfer belt be controlled within prescribed tolerances. In this manner, the intermediate transfer belt is transported along a predetermined path so that images recorded and developed thereon are precisely located relative to the processing stations disposed thereabout and the successive images recorded and developed thereon.

With respect to transport of a belt surface, an ideal system would involve a web-like belt entrained about perfectly cylindrical rollers mounted and secured in an exactly parallel relationship with one another. However, in actual practice, a roller will be tilted relative to the plane defined by the moving belt such that the belt velocity vector is not normal to the roller axis of rotation. Under these circumstances, the belt will move laterally relative to the roller until it is in a kinematically stable position. Existing methods for controlling belt lateral movement fall in two categories: passive alignment systems which make use of physical contact with the edge of the belt for alignment thereof; and active alignment systems utilizing active driving arrangements to alter the direction of travel of the belt. Existing passive alignment-systems for controlling belt lateral movement generally comprise crowned or flanged rollers. Frequently, high local stresses are produced on the belt edges by flanged devices resulting in undue wear and buckling of the edges of the highly sensitive photoconductive belt. Active systems, on the other hand, are generally characterized by servo systems employing steering rollers. Servo systems generally apply less stress to the side edges of a belt, but incorporate more sophisticated and expensive hardware. In any control system, whether passive or active, it is necessary to prevent high local stresses on the belt surface which may result in damage to this expensive component member.

Various active control systems directed toward the problem of image registration exist in the art. U.S. Pat. No. 3,435,693 describes a belt entrained about a plurality of spaced rollers, wherein one end of the rollers are journaled in a pivotable frame. If the belt engages a sensing member, the linkage rotates the frame to a position where the belt will track away from the sensing member until equilibrium is achieved. U.S. Pat. No. 3,500,694 describes a belt tracking system in which a sensing finger detects lateral movement of the belt, actuating a control motor which rotates a cam mechanism to pivot a steering roller so as to return the belt to the desired path of travel. U.S. Pat. No. 3,540,571 discloses a belt tracking mechanism having a servo arm connected pivotably to a frame, wherein horizontal motion of the belt causes vertical motion of the servo arm which, in turn, causes a steeling roller to pivot so as to restore the belt to the desired path of movement. U.S. Pat. Nos. 3,698,540, 3,702,131, and 3,818,391 describe belt steering apparatus employing a disc mounted loosely on one end of a belt support roller, wherein lateral movement of the belt causes the disc to pivot another support roller for returning the belt to the predetermined path of movement.

As typified by the exemplary systems, various types of servo systems have been devised to control lateral movement of a belt. The following disclosures appear to be relevant U.S. Pat. No. 4,429,985
Patentee: Yokota
Issued: Feb. 7, 1984
U.S. Pat. No. 4,527,686
Patentee: Satoh
Issued: Jul. 9, 1985
U.S. Pat. No. 5,169,140
Patentee: Wenthe, Jr.
Issued: Dec. 8, 1992

U.S. Pat. No. 4,429,985 discloses an apparatus for sensing and correcting deviation of an endless record belt. Deviation of the belt from its intended path is detected optically, the deviation signal being used to pivot a roll, about which the belt is entrained, about an axis perpendicular to its rotary axis, so as to apply differential tension to the belt to cause it to move along the pivoted roll.

U.S. Pat. No. 4,527,686 discloses a deflection correction apparatus for an endless belt. Optical sensors detect deflection of the belt and a cam tilts a tension roll to correct the deflection. Movement of a cam lever causes a movable plate to rotate about the tension roll shaft, thereby moving the tension roll vertically to induce correcting forces in the belt.

U.S. Pat. No. 5,169,140 discloses a method and apparatus for deskewing and side registering a sheet including a step for driving a sheet nondifferentially in a process direction, measuring the initial angle of skew, and driving the sheet differentially to compensate for side-to-side misregistration.

In accordance with one aspect of the present invention, a system for transporting a belt having first and second marginal edges along a predetermined path in a process direction of travel while maintaining lateral and skew alignment thereof is provided. The system includes: selectively controllable drive means for inducing transport motion of the belt; sensing means for detecting lateral and skew misalignment of the belt; and control means, responsive to the sensing means, for selectively operating the drive means to induce differential transport motion between the first and second marginal edges of the belt so as to compensate for detected lateral or skew misalignment thereof.

In accordance with another aspect of the present invention, an electrostatographic printing apparatus including a belt having first and second marginal edges and a system for transporting the belt along a predetermined path in a process direction of travel while maintaining lateral and skew alignment thereof, is provided. The printing apparatus comprises: a selectively controllable drive system for inducing transport motion of the belt; a sensing system for detecting lateral and skew misalignment of the belt; and a control system, responsive to the sensing system, for selectively operating the drive system to induce differential transport motion between the first and second marginal edges of the belt so as to compensate for detected lateral or skew misalignment thereof.

In accordance with yet another aspect of the invention, a method of transporting a belt having first and second marginal edges along a predetermined path in a process direction of travel while maintaining lateral and skew alignment thereof, is provided. This method includes the steps of: transporting the belt in a process direction; detecting lateral and skew misalignment of the belt; and selectively driving the belt for inducing differential transport motion between the first and second marginal edges of the belt to compensate for detected lateral or skew misalignment.

Other features of the present invention will become apparent as the following description proceeds and upon reference to the drawings, in which.

Figure 1:
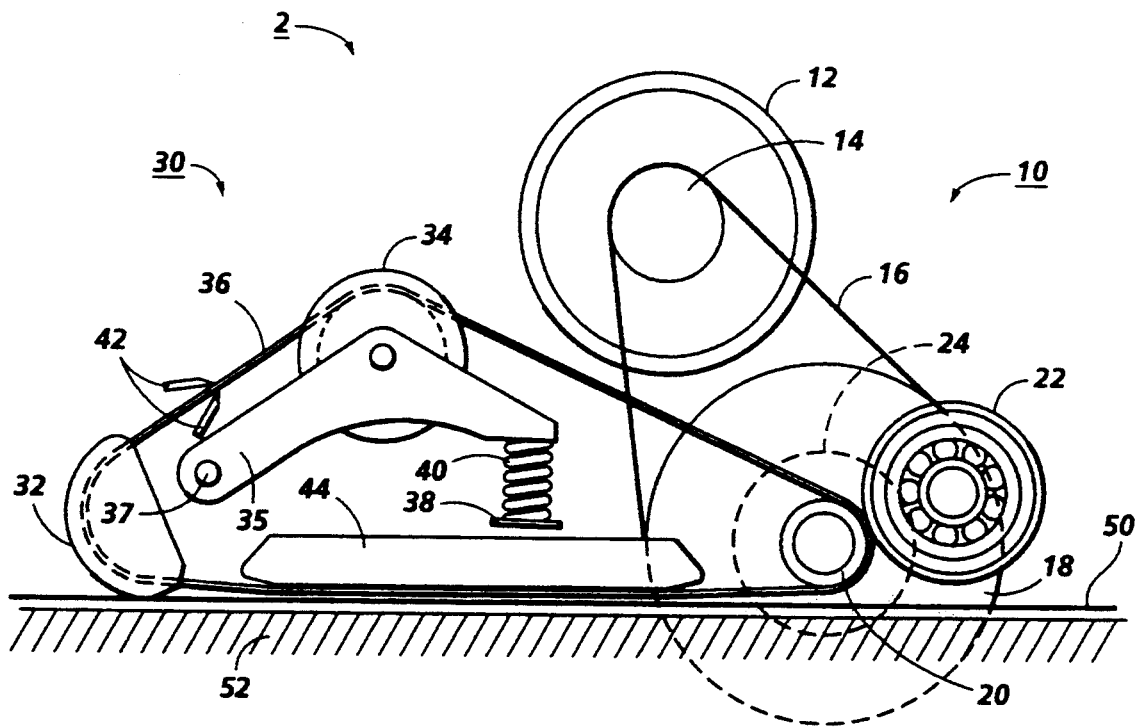
FIG. 1 is a side view of an exemplary conformable friction drive mechanism for implementing the alignment and registration system of the present invention.

Although the present invention will hereinafter be described in connection with a preferred embodiment, it is understood that the invention is not to be limited to that embodiment and it is further understood that the invention can be utilized for transporting various surfaces along a predetermined path. Therefore, it will be understood that the present invention is not limited in its application to electrostatographic or other printing applications. For example, the apparatus of the present invention may readily be employed in magnetic audio or video tape systems, motion picture camera systems, film projection systems, and textile processing apparatus, among others. The description of the present invention is intended to cover all alternatives, modifications, and equivalents as may be included within the spirit and scope of the invention as defined by the appended claims.

For a general understanding of the features of the present invention, reference is made to the drawings, in which like reference numerals have been used throughout to designate identical elements. In addition to the drawings provided herein, reference is also made to the voluminous patent literature available in the electrostatographic printing art, exemplary of which is commonly assigned U.S. Pat. No. 5,218,405 which schematically depicts and briefly describes the various components of an illustrative tandem architecture electrostatographic printing machine incorporating both drum and belt photoreceptor surfaces, the content of which is incorporated in its entirety by reference herein.

FIG. 1 shows an illustrative embodiment of a conformable friction drive system, generally indicated by reference numeral 2, which may be utilized in the practice of the present invention. A detailed description of a specific novel adaptation a the conformable friction drive mechanism which may be advantageously utilized in the practice of the image registration and alignment system of the present invention is provided in a commonly assigned patent application filed on even date herewith, identified by U.S. application Ser. No. 08/169,821 entitled "CONFORMABLE FRICTION DRIVE SYSTEM FOR BELT OR DRUM TRANSPORT". While the cited application for patent is incorporated by reference in its entirety into the present invention, a brief description of this conformable drive mechanism is provided, as follows.

Referring to the exemplary drive mechanism illustrated in FIG. 1, a drive source 10 is coupled to an intermediate friction drive generating apparatus 30 for inducing friction driven transport movement of photoconductive surface 50. Drive source 10 includes an electrical drive motor 12 having a drive shaft 14 extending from the drive motor 12 along a central axis thereof. The drive shaft 14 is coupled to a flywheel 18 by means of a frictionally entrained drive belt 16. Alternatively, the coupling may be of the toothed timing belt type. Flywheel 18 also includes a drive capstan 20 coaxially mounted thereon for coupling the rotational movement from the flywheel 18 to the intermediate friction drive generating apparatus 30. The intermediate drive 30 includes a drag shoe 32, and a tape tensioning sheave 34 mounted in the plane of the drive capstan 20, for operative association therewith, defining a predetermined path of travel for a drive tape loop 36, cooperatively positioned in alignment with, and entrained over, each of these component elements. While capstan 20 is mounted on flywheel 18 for rotation therewith, as previously described, drag shoe 32 is fixedly mounted and provided with a controlled friction surface coating, and tape tensioning sheave 34 is rotationally mounted on a lever arm 35 which together define a predetermined path of travel for drive tape loop 36. The lever arm 35 is pivotably mounted at a fixed pivot point 37 and urged in a direction opposing drive tape loop 36 by means of a resilient spring 40 mounted between a fixed support arm 38 and the lever arm 35. A pinch roll member 22 is also provided adjacent to drive capstan 20 for applying external force to the tape loop 36 on the capstan 20 thereby preventing slippage by increasing the normal contact forces at this critical drive transfer point. In addition to the drive components described hereinabove, a cleaning apparatus, preferably including cleaning blades 42, is also provided, wherein the cleaning blades 42 are positioned in resilient engagement with the drive tape loop 36 for removing extraneous debris therefrom to maintain tight contact at the drive capstan 20 for maximum drive rigidity and consistent control of the tape loop velocity vector.

It is noted that the drive tape loop 36 of the present invention is preferably fabricated from high tension steel or similar material for providing a nonelastic support substrate layer as a foundation for the endless drive tape loop. In this manner, tape stretch is virtually eliminated as a source of speed irregularity, resulting in long term speed reliability. The loop may be formed from a metal ribbon that is welded and ground or lapped to remove irregularities, cut from a tube, or electroformed. In addition, a very thin uniform layer of wear resistant elastomeric or polyurethane is bonded to the outer face of the drive loop. As with rubber and other elastomer industrial materials, the bonded layer can be machined to very thin and precise dimensions by mechanically grinding the exposed surface under copius liquid lubrication as the loop is circulated in a tooling fixture. This elastomer coating provides a positive frictional surface layer for contacting the smooth belt surface of the photoreceptor 50, such that positive contact adherence is formed therebetween with minimal contact force. It will be understood by those familiar with the art that the nonelastic substrate of loop 36 is rigidly coupled to the hard surface of capstan 20 by direct contact which essentially precludes any mechanical hysteresis or backlash. It is less obvious, however, that the yielding property that allows the elastomer to provide good conformability and high frictional contact forces with the driven surface 50 does not compromise the rigidity of the coupling between the nonelastic substrate layer and the driven surface 50 through the intervening elastomeric layer. Rigidity is maintained because the elastomeric is deliberately thin, and driving contact is established over an area of relatively long dimensions. Under these conditions the net coupling stiffness of the elastomeric layer can be made arbitrarily high by reducing its thickness and extending the length of contact between tape loop 36 and surface 50.

Utilizing the disclosed configuration, drive tape loop 36 is driven by capstan 20 around the predetermined path defined by the capstan 20, the drag shoe 32, and the tape tensioning sheave 34 in friction engagement with photoconductive surface 50 for inducing transport movement thereof. Thus, the general function of the intermediate friction drive generating apparatus 30 is to couple rotational movement from drive motor 12 to the photoconductive surface 50, in a manner that provides a constant velocity vector along the path of travel of the photoconductive surface 50, the so-called process direction thereof. The exemplary drive system shown in FIG. 1 provides constant surface speed substantially equivalent to the circumferential speed of the capstan 20 at the point of contact between the photoconductive surface 50 and the drive tape loop 36. In this embodiment, it may be advantageous to provide a spring loaded shoe 44 and/or a low friction support surface 52, as shown in FIG. 1, which may be crested for enhancing the contact engagement between the friction drive tape loop 36 and the photoconductive surface 50.

In order to control the rotation of the capstan 20 in critical applications, a rotary encoder system 24 may also be provided for detecting the incremental angular position of the capstan 20 on the common shaft with flywheel 18. Encoding systems for this purpose are well known in the art, exemplary of which is a single channel encoder as disclosed in U.S. Pat. No. 5,206,645, the contents of which are incorporated entirely herein by reference. The encoder system 24 provides an output signal which is used in a feedback control loop for dynamically adjusting instantaneous speed of the shaft of encoder 24 and, consequently, the speed of coaxially mounted capstan 20, from the action of motor 12, via drive belt 16 and flywheel 18. The registration and alignment features of the present invention are provided by coupling multiple drive systems and their respective encoders to a machine controller, as will be described.

It can be seen FIG. 1, and the description provided hereinabove, that the exemplary conformable friction drive system provides a versatile design configuration which can be used to induce transport motion in various machines and apparatus having transport surfaces of various sizes and forms. In this vein, it will be recognized that the same hardware can be used to provide identical speed and drive transport motion to drum surfaces as well as to planar surfaces. In order to drive a drum surface, shoe element 44 is commonly reconfigured or removed for permitting tape loop 36 to conform to the drum surface.

Figure 2:
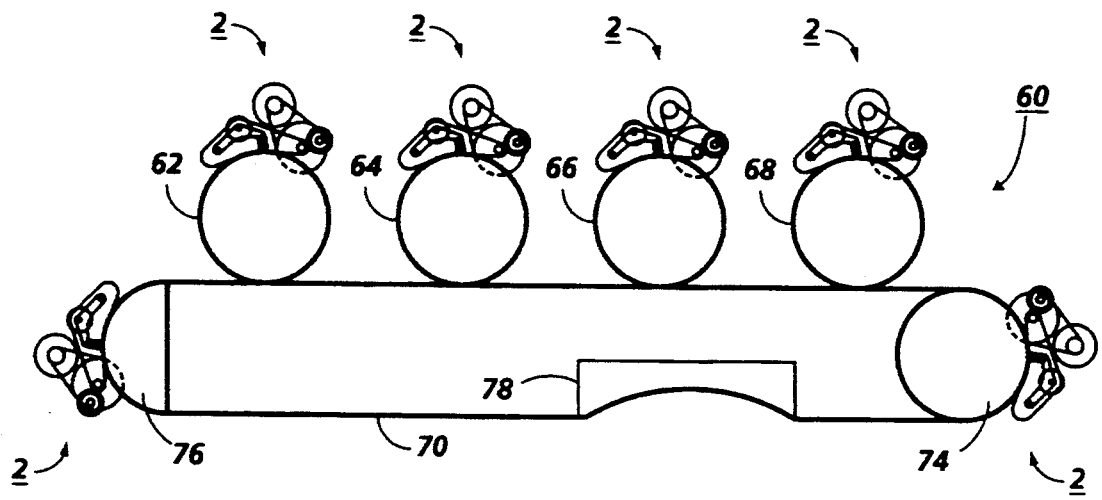
FIG. 2 is a simplified side view of a typical tandem electrostatographic printing machine showing various configurations in which the exemplary conformable drive system of FIG. 1 might be advantageously utilized.
Figure 3:
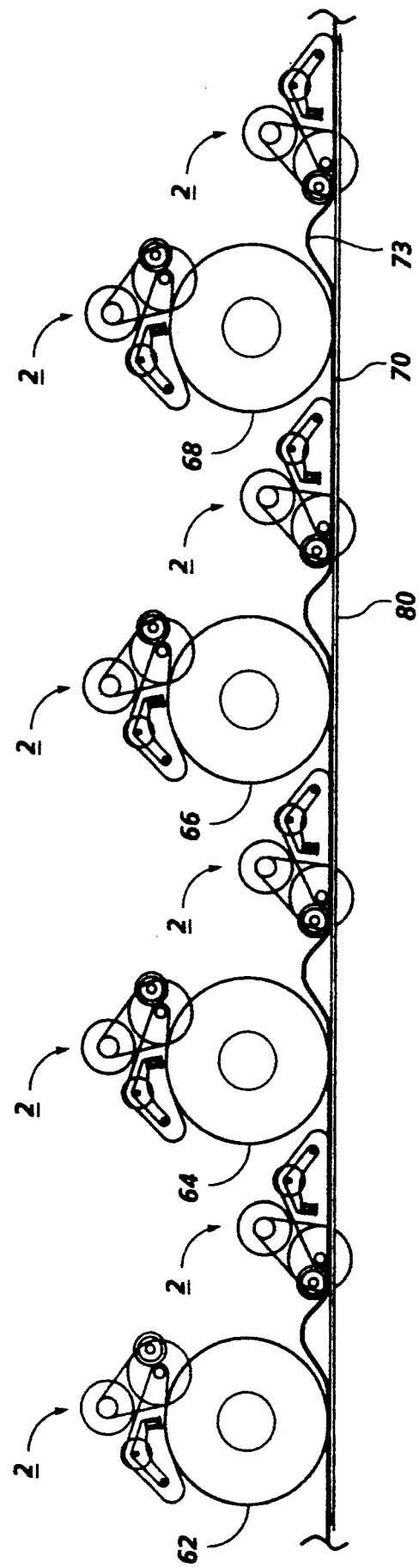
FIG. 3 is a partial side view showing a plurality of conformable friction drive systems configured to provide alignment and registration in a tandem electrostatographic printing machine as shown in FIG. 2.

Referring now to FIG. 2, a well known tandem architecture engine commonly used for multicolor imaging and disclosed in previously referenced U.S. Pat. No. 5,218,405, among numerous other patents and publications, is shown, wherein a multicolor imaging system 60 includes four photoreceptors 62, 64, 66 and 68. Each photoreceptor carries a unique color separation obtained by an individual electrostatographic processor (not shown). The four color separations are sequentially transferred to an intermediate belt 70 in close registration with one another to produce a full color image. In this configuration, photoreceptive drums 62, 64, 66, 68 may also each be independently driven by separate and independently controllable conformable drive systems, as shown, and generally identified by reference numeral 2. Intermediate transfer belt 70 may also be driven by independently controllable conformable friction drive mechanisms, also generally identified by reference numeral 2. The intermediate transfer belt 70 has first and second opposed marginal edges and can be transported along its predetermined path by means of one, or a plurality of conformable drive systems positioned in the marginal edges of the belt. As shown, the conformable drive systems can be mounted opposite an idler drum 74, or a low friction drag shoe 76. In this configuration, it may be advantageous to provide a vacuum tensioner 78 for accommodating excess belt slack or maintaining substantially uniform tension in the immediate transfer belt along the entire path of travel thereof. Alternatively, a plurality of conformable drive systems can be positioned adjacent a substantially planar surface of the intermediate transfer belt, as shown in FIG. 3. Using the system architecture illustrated in FIG. 3 as an example, multiple conformable drive systems, as disclosed herein, are incorporated at various locations along the path of travel, in the marginal edge regions of the intermediate transfer belt 70 and between each photoreceptor drum 62, 64, 66, 68 for providing precise alignment and registration in a multicolor electrostatographic printing apparatus.

Referring now to the specific subject matter of the present invention, the general operation of the image registration/belt alignment and steering method employed in conjunction with conformable friction drive systems, as described hereinabove, will be described. It will be appreciated that the present invention may find advantageous use in any application in which a designated portion of a belt or web must be registered and/or deskewed, including, for example, other electrostatographic printing processes and architectures, as well as applications where the registration of a moving member is important. For purposes of the present detailed description, registration of a belt in a tandem architecture multicolor electrostatographic processor as described in FIG. 3 will be described.

Figure 4:
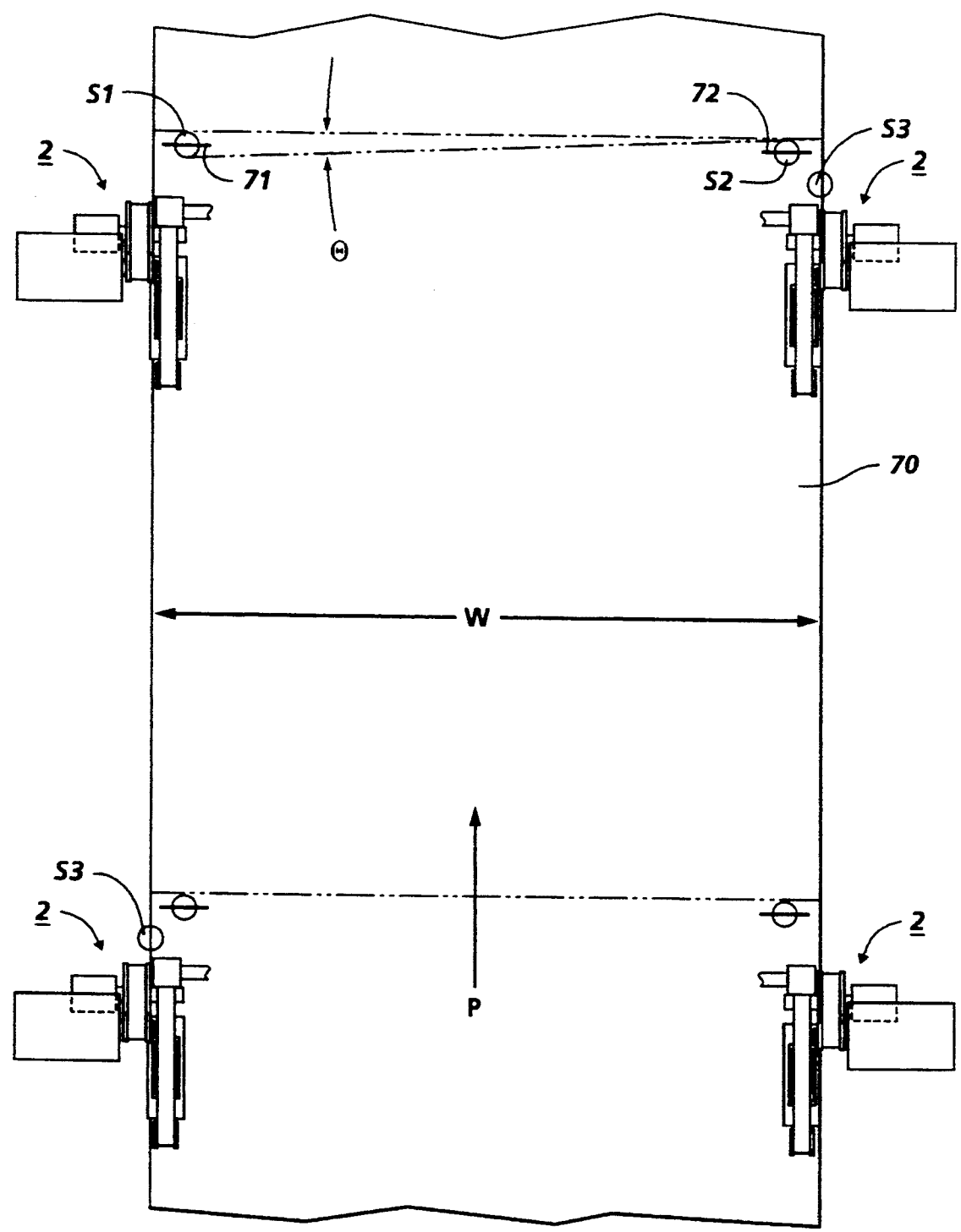
FIG. 4 is a top elevational view of the alignment and registration system of the present invention, depicting the movement of the belt in the process direction under control of a plurality of conformable friction drive mechanisms as shown in FIG. 1.

Referring to FIG. 4, a plurality of conformable drive systems 2 may be used to transport an intermediate transfer belt 70 in a process direction, shown by arrow "P". Each one of the conformable drive systems 2 make up a given drive system pair, positioned on opposite sides of the intermediate transfer belt 70 along the marginal edges thereof, transverse to the process direction. Each drive system 2 is generally similar in construction and operational characteristics, and is independently controllable for providing separate and autonomous drive transport to the intermediate transfer belt surface 70. Thus, each drive system 2 making up a pair can be operated at the same speed, at different speeds, and even in opposite directions, for effecting steering and deskewing, as well as precise speed control and alignment of the belt 70, as will be further described in detail.

In a tandem architecture system as shown in FIGS. 2 and 3, each drive system pair is located adjacent to a photoreceptive drum 62, 64, 66, 68 for aligning the belt 70 as it is transported into position relative to a drum. The separation between each photoreceptive drum 62, 64, 66, 68 is at least large enough to permit an entire image on the belt; this imaging area is referred to as a "panel". Each panel is delineated by at least one pair of fiducial markings 71, 72, which might include an aperture or some other optically or magnetically sensed symbol formed on the intermediate transfer belt 70, outside the image bearing area thereon, along inboard and outboard edges thereof. Sensors S1 and S2 are suitably spaced on a line substantially perpendicular to the path of belt travel, or the process direction, slightly downstream from each conformable drive system 2, and preferably spaced at approximately equal distances from each other relative to the center of the belt 70. A third sensor S3 may also be provided, located at an inboard or an outboard position along which a side edge of the intermediate transfer belt 70 will pass, for detection by the sensor. These sensors may be advantageously comprised of photodetecting devices which will produce a signal upon detection of a fiducial marking. Various positioning of the sensors and the drive system pairs with respect to each other are possible. One exemplary sensing scheme and control apparatus which could be adapted for use in the present embodiment is disclosed in U.S. Pat. No. 5,208,633 to Genovese, the contents of which are incorporated in their entirety by reference herein.

In the embodiment shown in FIG. 4, the intermediate transfer belt 70 is actively driven through an individual processing station in alignment with a photoreceptor drum 62, 64, 66, 68, wherein the fiducial marking/sensor arrangement provides-a control signal to each drive system for actively aligning the intermediate transfer belt 70, as necessary. In this manner, a lead edge portion of a given panel is sensed by sensors S1 and S2, as the fiducial markings, delineating a designated panel for image transfer of the intermediate transfer belt 70 approach the sensing arrangement. Under ideal conditions, sensors S1 and S2 will detect the presence of fiducial markings 71, 72 on the intermediate transfer belt substantially simultaneously, thereby indicating that no angular misalignment or so called skew exists in the alignment of belt 70. Conversely, one of the fiducial markings 71,72 can be sensed prior to the other, indicating that the intermediate transfer belt 70 is skewed. In either event, the sensors S1, S2 transmit an electrical signal to a control system for use in the present invention. This arrangement provides a system for actively steering the intermediate transfer belt 70 as the intermediate transfer belt 70 travels along its predetermined endless path. While various controllers can be incorporated into the present invention, a typical electrostatographic printing machine will include a microprocessor capable of executing control instructions in accordance with a predetermined sequence, and subject to sensed parameters, for producing a controlling output in response thereto. In the present invention, an Intel 8051 microcontroller is a satisfactory microprocessor for control of, for example, each individual drive system of the invention, providing image registration in a multicolor imaging apparatus. It will be understood that various alternatives and variations to such control systems are available and include various calibrations of sensor pairs like S1 and S2 to determine true skew in the presence of inadvertently displaced detectors.

Thus, sensors S1, S2, and S3 provide control signals to a controller for providing sensing information, from which operation of the individual conformable friction drive systems is controlled. Utilizing the sensing information from sensors S1, S2, and S3, the control system functions to control the operation of each individual drive motor associated with each individual drive system 2. In particular, the control system drives a pair of drive systems to provide an exact increment of rotational movement to the drive motors and thus to provide precise transport to the intermediate transfer belt 70. More importantly, it will be appreciated that the control system may cause each drive motor to be driven at a different rotational velocity so that the intermediate transfer belt 70 can be driven differentially along its path of movement, thereby causing the intermediate transfer belt 70 to be rotated or shifted to provide alignment thereof along its predetermined path of travel. Thus, lateral and angular adjustment to the belt position can be induced for causing misalignments to be removed by actuating each drive system pair individually, thereby permitting repositioning of the inboard and outboard edges of the intermediate transfer belt 70.

It is noted that in order to enable the belt shifting contemplated by the present invention, each panel on the intermediate transfer belt 70 must be free to slide both laterally and transversely along the path of travel of the belt. In a typical configuration, the intermediate transfer belt 70 is held rigidly by means of guide rollers and is constrained to lie in a single plane thereby. However, in order to implement the present invention, the transport of each panel is controlled independently using a layout as shown in FIGS. 3 and 4, wherein a buckle or ruck 73 is created between each panel for interrupting the forward movement of the intermediate transfer belt 70 to allow some longitudinal and transverse freedom of movement in a given panel. Hence, a substantially non-tensioned condition is created in the belt so as to permit correction of both lateral and skew misalignments therein. In the illustrated embodiment of FIG. 3., the intermediate transfer belt 70 is supported by a low friction platen 80, such as a plastic laminate having a low surface energy coating thereon. It will be noted that this architecture need not have any belt drums or rollers incorporated into the belt drive subassembly. Thus, the source for problematic periodic errors caused by roll runout is eliminated. With no rollers in the system, a much less expensive configuration is enabled, free of periodic errors caused by misalignment of certain structures. Indeed, the present invention can permit a configuration wherein no moving parts exist along the belt module except for the conformable drive system described herein. Registration and alignment between each photoreceptor drum 62, 64, 66, 68 and the intermediate transfer belt 70 is completely contained in the control system which independently operates the drive motor 12 of each of the conformable drive systems 20 including those associated with the photoreceptive drums 62, 64, 66, 68.

Figure 5:
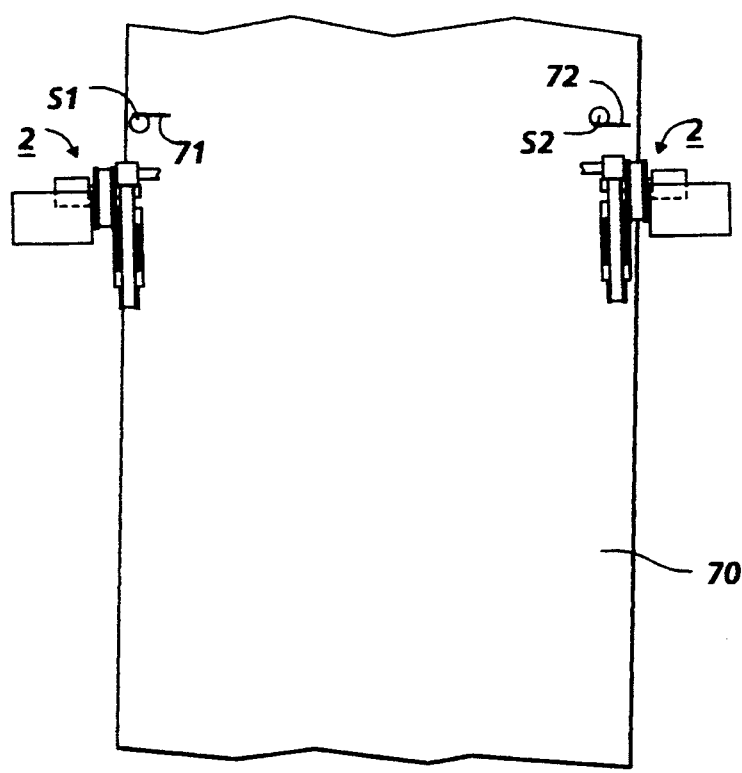
FIG. 5 is a top elevational view of the alignment and registration of the present invention illustrating drive systems being driven in opposite directions for achieving skew realignment and correction.
Figure 6:
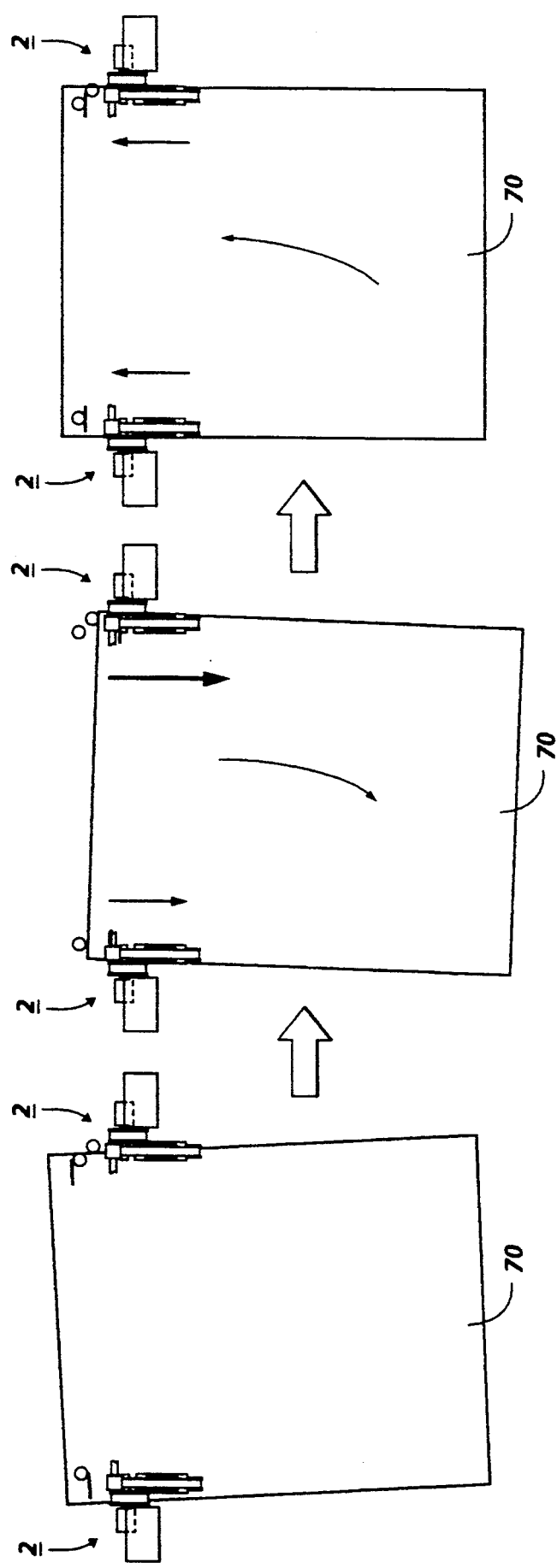
FIGS. 6 and 7 are a series of time lapse views showing the differential drive velocities of each drive system and the relative position of the belt along its predetermined path.
Figure 7:
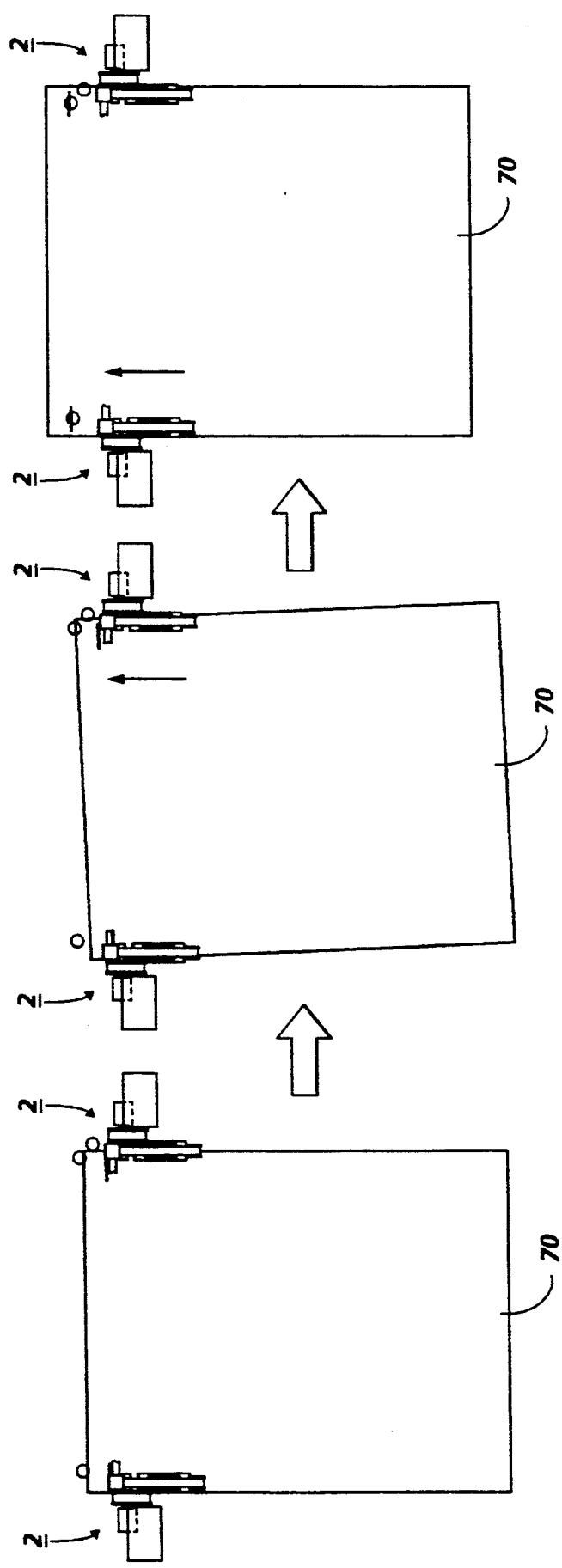

Various approaches to lateral and skew misalignments can be implemented utilizing the independently controllable drive system pairs and the sensing arrangement disclosed herein, as shown in FIGS. 5–7. For example, skew correction can be achieved by simply driving the individual drive systems 2 of a drive system pair at differential speeds to produce differential transport motion between opposing marginal edges of the belt. This approach may even include driving one drive system in a direction opposite the other drive system to correct the skew misalignment, as illustrated in FIG. 5.

Alternatively, lateral misalignment as shown in FIG. 6 can be corrected by reversing the intermediate transfer belt such that the intermediate transfer belt 70 travels in a direction opposite to the process direction and simultaneously inducing a skew by reversing the belt at differential speeds. Subsequently, the drive system pair can be driven differentially in the process direction to correct for the induced skew, simultaneously realigning the intermediate transfer belt to remove the lateral misalignment therein. Alternatively, an additional step of non-differentially driving the belt having the induced skew in the process direction of travel can be performed before the step of correcting for the induced skew.

In yet another alternative, lateral misregistration can be corrected by the process shown in FIG. 7, wherein one of the drive systems in the drive system pair is stopped while the other drive motor is allowed to continue to operate such that only one side of the intermediate transfer belt 70 is transported in the process direction. After a predetermined period of time, the operating drive system is brought to a stop and the opposite drive system is actuated to provide transport motion of the intermediate transfer belt 70 along the side opposite to the side which had been previously in motion. The position of the intermediate transfer belt 70 is monitored through the sensor arrangement and eventually both drive systems are activated to normal process speed for transporting a given panel through the processing station in proper alignment and registration with the photoreceptive drum. It will be appreciated that various methods and processes may be implemented in an effort to most efficiently correct for lateral and skew misalignments. Exemplary deskew and lateral registration processes are described with respect to sheet deskew and registration in U.S. Pat. No. 4,971,304 to Lofthus and U.S. Pat. No. 5,169,140 to Wenthe, Jr. The processes described in these patents may be adapted to operate the present invention.

An illustrative example of the type of correction for lateral misalignment provided by the present invention is illustrated in the following example, wherein the width of an exemplary intermediate transfer belt 70, identified in FIG. 4 by the variable "W", is 10 inches. A delay in the inboard drive system of 0.1 inches creates a skew angle of 0.57 degrees (TAN $\ominus = 0.1/W$), such that the lateral shift is just 1% of the measured advance. In this example, a lateral correction of 3.17 mils is made by advancing the belt 317 mils (0.317") before removing the 0.1 inch skew by inducing a corresponding 0.1 inch skew in the opposite direction, as illustrated by the belt transport shown in the following table:

| LEFT | RIGHT |
| --- | --- |
| 0.000" | 0.100" |
| 0.317" | 0.317" |
| 0.100" | 0.000" |

It will be noted from the table that the total advance of the belt will be 0.417 inches on both the left and right sides of the belt, while a lateral correction of 3.17 mils is made. Thus, lateral correction is provided by inducing skew, transporting the skewed belt for a short period and correcting for the induced skew. It will be understood by those familiar with the art that the same corrective effect can be accomplished by a cumulative sequence of smaller motions applied incrementally, or a smooth and continuous application of differential rates. Thus for example, a sequence of 10 actions with displacements of 0.010" and 0.0317" respectively could be used in place of the single action shown in the table.

In recapitulation, it should now be clear from the foregoing discussion, that the apparatus of the present invention provides a novel system for belt transport, belt steering, alignment, and image registration in a multi-color imaging apparatus utilizing conformable friction drive system pairs to independently drive the intermediate transfer belt. It is believed that the configuration of the present invention provides enhanced image registration and alignment to a transported surface for maintaining substantially constant registration and alignment control thereof.

It is therefore apparent that there has been provided, in accordance with the present invention, a novel transport and image registration system that fully satisfies the aims and advantages set forth hereinabove. While the present invention has been described in conjunction with a specific embodiment thereof, it will be evident to those skilled in the art that many alternatives, modifications and variations are possible in order to achieve the desired results. Accordingly, the present invention is intended to embrace all such alternatives, modifications and variations which may fall within the spirit and scope of the following claims.

I claim:

1. A system for transporting a belt having first and second marginal edges along a predetermined path in a process direction of travel while maintaining lateral and skew alignment thereof, comprising:
   selectively controllable drive means including a conformable friction drive apparatus, comprising:
      drive source means; and
      friction drive means, including an endless tape loop having a nonelastic support layer and a frictional contact layer, being placed in friction contact with the belt for inducing transport motion of the belt;
   sensing means for detecting lateral and skew misalignment of the belt; and
   control means, responsive to said sensing means, for selectively operating said drive means to induce differential transport motion between the first and second marginal edges of the belt so as to compensate for detected lateral or skew misalignment thereof.

2. The system of claim 1, wherein said conformable friction drive apparatus further includes encoder means for monitoring angular rotation of said friction drive means.

3. The system of claim 1, wherein said sensing means includes a pair of sensing devices positioned along a line substantially perpendicular to the process direction of travel of the belt for monitoring alignment of the belt along the process direction of travel thereof.

4. The system of claim 3, wherein said sensing means further includes a side sensing device for monitoring lateral alignment of the belt along a line transverse to the process direction thereof.

5. The system of claim 1, further including a support platen for supporting the belt in contact with said friction drive means.

6. A system for transporting a belt having first and second marginal edges alone a predetermined path in a process direction of travel while maintaining lateral and skew alignment thereof, comprising:
   selectively controllable drive means for inducing transport motion of the belt, including first and second conformable friction drive systems positioned along a line substantially perpendicular to the process direction of travel of the belt, each drive system being independently controllable,
   said drive means having a conformable friction drive apparatus, including:
      drive source means;
      friction drive means, including an endless tape loop operatively associated with said drive source means for being driven thereby, said tape loop being placed in friction contact with said belt to induce transport motion thereof;
   sensing means for detecting lateral and skew misalignment of the belt;
   control means, responsive to said sensing means, for selectively operating said drive means to induce differential transport motion between the first and second marginal edges of the belt so as to compensate for detected lateral or skew misalignment thereof; and encoder means for monitoring angular rotation of said friction drive means.

7. A system for transporting a belt having first and second marginal edges along a predetermined path in a process direction of travel while maintaining lateral and skew alignment thereof, comprising:

selectively controllable drive means for inducing transport motion of the belt;

sensing means for detecting lateral and skew misalignment of the belt; and control means, responsive to said sensing means, for selectively operating said drive means to induce differential transport motion between the first and second marginal edges of the belt so as to compensate for detected lateral or skew misalignment thereof; and means for generating a buckle in said belt to provide a substantially nontensioned condition therein so as to permit differential transport of said belt.

8. An electrostatographic printing apparatus including an belt having a first and second marginal edges and a system for transporting the belt along a predetermined path in a process direction of travel while maintaining lateral and skew alignment thereof, comprising:

a selectively controllable drive system including a conformable friction drive apparatus, comprising drive source means; and a friction drive assembly, including an endless tape loop having a nonelastic support layer and a frictional contact layer, being placed in friction contact with the belt for inducing transport motion of the belt;

a sensing system for detecting lateral and skew misalignment of the belt; and a control system, responsive to said sensing system, for selectively operating said drive system to induce differential transport motion between the first and second marginal edges of the belt so as to compensate for detected lateral or skew misalignment thereof.

9. The electrostatographic printing apparatus of claim 8, wherein said conformable friction drive assembly further includes an encoder for monitoring angular rotation of said friction drive apparatus.

10. The electrostatographic printing apparatus of claim 8, wherein said sensing system includes a pair of sensing devices positioned along a line substantially perpendicular to the process direction of travel of the belt for monitoring alignment of the belt along the process direction of travel thereof.

11. The electrostatographic printing apparatus of claim 10, wherein said sensing system further includes a side sensing device for monitoring lateral alignment of the belt along a line transverse to the process direction thereof.

12. The electrostatographic printing apparatus of claim 8, further including a support platen for supporting the belt in contact with said friction drive assembly.

13. The electrostatographic printing apparatus of claim 8, further including a plurality of photoreceptive drums for transferring independent color separations of a multi-color image to the belt.

14. The electrostatographic printing apparatus of claim 13, wherein said selectively controllable drive system includes a plurality of conformable friction drive apparatus arranged in pairs along a line substantially perpendicular to the process direction of travel of the belt, adjacent each of said plurality of photoreceptive drums.

15. An electrostatographic printing apparatus including a belt having a first and second marginal edges and a system for transporting the belt along a predetermined path in a process direction of travel while maintaining lateral and skew alignment thereof, comprising:

a selectively controllable drive system for inducing transport motion of the belt, including a drive source;

a pair of conformable friction drive apparatus positioned along a line substantially perpendicular to the process direction of travel of the belt, each drive system being independently controllable; and a friction drive assembly, including an endless tape loop operatively associated with said drive source for being driven thereby, said tape loop being placed in friction contact with the belt to induce transport motion thereof;

a sensing system for detecting lateral and skew misalignment of the belt;

a control system, responsive to said sensing system, for selectively operating said drive system to induce differential transport motion between the first and second marginal edges of the belt so as to compensate for detected lateral or skew misalignment thereof; and an encoder for monitoring angular rotation of said friction drive apparatus.

16. An electrostatographic printing apparatus including an belt having a first and second marginal edges and a system for transporting the belt along a predetermined path in a process direction of travel while maintaining lateral and skew alignment thereof, comprising:

a selectively controllable drive system for inducing transport motion of the belt;

a sensing system for detecting lateral and skew misalignment of the belt;

a control system, responsive to said sensing system, for selectively operating said drive system to induce differential transport motion between the first and second marginal edges of the belt so as to compensate for detected lateral or skew misalignment thereof; and means for generating a buckle in the belt to provide a substantially nontensioned condition therein so as to permit differential transport of the belt.

17. A method of transporting a belt having first and second marginal edges along a predetermined path in a process direction of travel while maintaining lateral and skew alignment thereof, comprising the steps of:

transporting the belt in a process direction;

detecting lateral and skew misalignment of the belt; and selectively driving the belt for inducing differential transport between the first and second marginal edges thereof to compensate for detected lateral or skew misalignment, wherein said selective driving step includes the ordered steps of:

differentially driving the belt in a direction opposite to the process direction of travel to induce a skew therein; and differentially driving the belt in the process direction of travel to remove the induced skew therefrom.

18. A method of transporting a belt having first and second marginal edges along a predetermined path in a process direction of travel while maintaining lateral and skew alignment thereof, comprising the steps of:
- transporting the belt in a process direction;
- detecting lateral and skew misalignment of the belt; and
- selectively driving the belt for inducing differential transport between the first and second marginal edges thereof to compensate for detected lateral or skew misalignment, wherein said selective driving step includes the ordered steps of:
  - differentially driving the belt in a direction opposite to the process direction of travel to induce a skew therein;
  - non-differentially driving the belt having the induced skew in the process direction of travel; and
  - differentially driving the belt in the process direction of travel to remove the induced skew therefrom.

* * * * *